United States Patent
Hu et al.

(10) Patent No.: US 12,272,098 B1
(45) Date of Patent: Apr. 8, 2025

(54) POSITIONING METHOD, POSITIONING DEVICE, AND PROCESSING METHOD FOR WAFER

(71) Applicant: SHENZHEN ROBOTVISIONTECHNOLOGY CO.,LTD., Shenzhen (CN)

(72) Inventors: Yanchao Hu, Shenzhen (CN); Xiangtong Wang, Shenzhen (CN); Shuang Mei, Shenzhen (CN); Tingkai Jiang, Shenzhen (CN)

(73) Assignee: SHENZHEN ROBOTVISIONTECHNOLOGY CO.,LTD., Shenzhen (CN)

( * ) Notice: Subject to any disclaimer, the term of this patent is extended or adjusted under 35 U.S.C. 154(b) by 0 days.

(21) Appl. No.: 19/007,687

(22) Filed: Jan. 2, 2025

(30) Foreign Application Priority Data

Feb. 2, 2024 (CN) .......................... 202410148336.6

(51) Int. Cl.
*G06T 3/60* (2024.01)
*G06T 7/73* (2017.01)

(52) U.S. Cl.
CPC ...... *G06T 7/74* (2017.01); *G06T 2207/30148* (2013.01); *G06T 2207/30204* (2013.01); *G06T 2207/30241* (2013.01)

(58) Field of Classification Search
CPC ................ G06T 3/60; G06T 7/60; G06T 7/74
See application file for complete search history.

(56) References Cited

U.S. PATENT DOCUMENTS

2008/0013089 A1\* 1/2008 Ishii ...................... G03F 9/7011
356/400

FOREIGN PATENT DOCUMENTS

| CN | 101996398 B | 3/2011 |
|---|---|---|
| CN | 104718607 B | 6/2015 |
| CN | 105609458 B | 5/2016 |
| CN | 115856000 A | 3/2023 |
| CN | 117012688 A | 11/2023 |
| JP | H10173029 A | 6/1998 |

\* cited by examiner

*Primary Examiner* — Sam Bhattacharya
(74) *Attorney, Agent, or Firm* — Jeenam Park

(57) ABSTRACT

A positioning method, a positioning device, and a processing method for wafer are provided. The wafer includes a plurality of dies. The positioning method for wafer includes: obtaining a first reference image of the wafer and obtaining a first rotation angle based on the first reference image and a first positioning template; causing the wafer to rotate according to the first rotation angle; obtaining a second reference image of the wafer rotated according to the first rotation angle and obtaining a second rotation angle based on the second reference image and the first positioning template; causing the wafer to rotate according to the second rotation angle; obtaining a third reference image of the wafer rotated according to the second rotation angle and obtaining position information of each die contained in the wafer based on the third reference image and a second positioning template.

10 Claims, 4 Drawing Sheets

POSITIONING METHOD, POSITIONING DEVICE, AND PROCESSING METHOD FOR WAFER

CROSS-REFERENCE TO RELATED APPLICATIONS

This application claims priority to Chinese Patent Application No. 202410148336.6, filed on Feb. 2, 2024, which is hereby incorporated by reference in its entirety.

TECHNICAL FIELD

The present disclosure relates to the field of semiconductor technologies, and in particular, to a positioning method, a positioning device, and a processing method for wafer.

BACKGROUND

Wafer refers to various chips used in a production of silicon semiconductor integrated circuits. Due to its circular shape, it is called a circular wafer. Wafers are usually divided into many rectangular small squares, and this small square is called a die. The commonly used sizes of wafers are 4 inches, 6 inches, 8 inches, and 12 inches in diameter.

The wafers need to undergo testing, photolithography, cutting, and other processes before they can be fabricated into semiconductor integrated circuits. In wafer inspection or cutting, it is necessary to accurately positioning a position and an angle of each die in the wafers. The fluctuation of the position and angle of the wafers affects a subsequent processing. Although there is pre-alignment during loading, that is, when placing the wafers on an operating table, the accuracy of pre-alignment is not high due to a precision of the mechanical equipment used for loading.

Thus, the positioning accuracy of wafers is not high in the existing technology.

SUMMARY

In order to solve the above technical problems or at least partially solve the above technical problems, the present application provides a positioning method, a positioning device, and a processing method for wafer.

In a first aspect, the present application provides a positioning method for wafer, where the wafer includes a plurality of dies, and the positioning method for wafer includes:
obtaining a first reference image of the wafer and obtaining a first rotation angle based on the first reference image and a first positioning template;
causing the wafer to rotate according to the first rotation angle;
obtaining a second reference image of the wafer rotated according to the first rotation angle and obtaining a second rotation angle based on the second reference image and the first positioning template;
causing the wafer to rotate according to the second rotation angle;
obtaining a third reference image of the wafer rotated according to the second rotation angle and obtaining position information of each die contained in the wafer based on the third reference image and a second positioning template.

In some embodiments of the present application, a first positioning feature is a cross-shaped pattern formed by grooves between two adjacent dies in a positioning block composed of 2*2 dies;
the first positioning template is a pattern that matches the first positioning feature, and the first positioning template is capable of being coincided with a reference axis;
where the obtaining a first reference image of the wafer and obtaining a first rotation angle based on the first reference image and a first positioning template includes:
obtaining a center of the wafer;
causing the wafer to move so that the center of the wafer moves to a center of a first view field;
causing the first view field to move to a plurality of random positions;
obtaining the first reference image at each random position;
obtaining one first positioning feature from each first reference image;
obtaining a first angle between each first positioning feature and the first positioning template;
obtaining an average value of all first angles as the first rotation angle.

In some embodiments of the present application, before obtaining a second reference image of the wafer rotated according to the first rotation angle, the method further includes:
obtaining a height and a width of each die in the wafer;
causing a height of a second view field be greater than a half of a height of one die and less than the height of the die,
causing a width of the second view field be greater than a half of a width of one die and less than the width of the die.

In some embodiments of the present application, the obtaining a second reference image of the wafer rotated according to the first rotation angle and obtaining a second rotation angle based on the second reference image and the first positioning template includes:
causing the second view field to move to a plurality of sampling positions according to a first preset trajectory;
obtaining the second reference image at each sampling position;
obtaining one first positioning feature from each second reference image;
obtaining a positioning center of each first positioning feature;
fitting all positioning centers into a positioning straight line;
obtaining an angle between the positioning straight line and the first positioning template as the second rotation angle.

In some embodiments of the present application, after causing the wafer to rotate according to the second rotation angle and before obtaining a third reference image of the wafer rotated according to the second rotation angle, the method further includes:
causing the second view field to move to a plurality of calibration positions according to a second preset trajectory;
obtaining a calibration image at each calibration position;
obtaining one first positioning feature from each calibration image;
obtaining a positioning center of each first positioning feature;
fitting all positioning centers as a calibration straight line;
determining whether an angle between the calibration straight line and the first positioning template meets a preset threshold;

when the preset threshold is met, confirming that the wafer has been leveled;

when the preset threshold is not met, re-obtaining the second rotation angle.

In some embodiments of the present application, the first preset trajectory is:

starting from an initial position, moving upwards along a longitudinal axis of the reference axis with a first preset length as a step size, determining several trajectory positions, returning to the initial position, moving downwards along the longitudinal axis of the reference axis with the first preset length as the step size, and determining the several trajectory positions;

the second preset trajectory is:

starting from an initial position, moving along a horizontal axis of the reference axis to right with a second preset length as a step size, determining several trajectory positions, returning to the initial position, moving along the horizontal axis of the reference axis to left with the second preset length as the step size, and determining the several trajectory positions.

In some embodiments of the present application, the first preset trajectory is:

starting from an initial position, moving along a horizontal axis of the reference axis to right with a first preset length as a step size, determining several trajectory positions, returning to the initial position, moving along the horizontal axis of the reference axis to left with the first preset length as the step size, and determining the several trajectory positions;

the second preset trajectory is:

starting from an initial position, moving upwards along a longitudinal axis of the reference axis with a second preset length as a step size, determining several trajectory positions, returning to the initial position, moving downwards along the longitudinal axis of the reference axis with the second preset length as the step size, and determining the several trajectory positions.

In some embodiments of the present application, a second positioning feature is a specific shape on the wafer, and the second positioning template is a specific shape that matches the second positioning feature, where the obtaining a third reference image of the wafer rotated according to the second rotation angle and obtaining position information of each die contained in the wafer based on the third reference image and a second positioning template includes:

causing the second view field to move to an area near the second positioning feature on the wafer;

starting from any position in the area near the second positioning feature, moving to a plurality of reference positions according to a third preset trajectory;

obtaining the third reference image at each reference position;

obtaining one second positioning feature from each third reference image;

taking a reference position of an obtained second positioning feature as a positioning position;

obtaining the position information of each die based on the positioning position, a height of each die, a width of each die, and widths of the grooves.

In a second aspect, a positioning device for wafer is provided, including:

a camera device, configured to obtain a first reference image of the wafer and obtain a first rotation angle based on the first reference image and a first positioning template;

a rotation device, configured to cause the wafer to rotate at the first rotation angle;

where the camera device is further configured to obtain a second reference image of the wafer rotated according to the first rotation angle and obtain a second rotation angle based on the second reference image and the first positioning template;

the rotation device is further configured to cause the wafer to rotate according to the second rotation angle; and a positioning device, configured to obtain a third reference image of the wafer rotated according to the second rotation angle and obtain position information of each die contained in the wafer based on the third reference image and a second positioning template.

In a third aspect, a processing method for wafer is provided, which includes positioning a to-be-processed wafer with the positioning method for wafer and processing the to-be-processed wafer.

The present application provides a positioning method for wafer, which includes obtaining a first reference image of the wafer and obtaining a first rotation angle based on the first reference image and a first positioning template; causing the wafer to rotate according to the first rotation angle; obtaining a second reference image of the wafer rotated according to the first rotation angle and obtaining a second rotation angle based on the second reference image and the first positioning template; causing the wafer to rotate according to the second rotation angle; obtaining a third reference image of the wafer rotated according to the second rotation angle and obtaining position information of each die contained in the wafer based on the third reference image and a second positioning template. The method of the present application, based on characteristics of the wafer, the wafer is rotated twice to be accurately leveled, thereby enabling precise positioning of each die of the wafer.

BRIEF DESCRIPTION OF DRAWINGS

The accompanying drawings are incorporated into the specification and form a part thereof, illustrating embodiments in accordance with the present application and used together with this specification to explain the principles of the present application.

In order to provide a clearer explanation of the embodiments of the present application or the technical solutions in the prior art, a brief introduction will be given below to the accompanying drawings required for the description of the embodiments or the prior art. It is obvious that for those skilled in the art, other drawings can be obtained based on these drawings without a need for creative work.

DESCRIPTION OF EMBODIMENTS

In order to clarify the purpose, technical solution, and advantages of the embodiments of the present application, the following will provide a clear and complete description of the technical solution in the embodiments of the present application in combination with the accompanying drawings. Obviously, the described embodiments are a part of the embodiments of the present application, not all of them. Based on the embodiments in the present application, all other embodiments obtained by those skilled in the art without creative work are within the protection scope of the present application.

Figure 1:
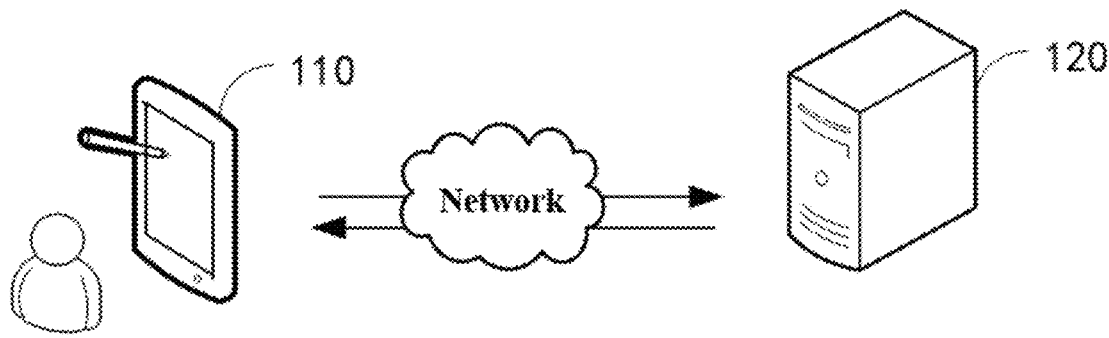
FIG. 1 shows an application environment diagram of a positioning method for wafer according to an embodiment of the present application.

FIG. 1 shows an application environment diagram of a positioning method for wafer according to an embodiment. Referring to FIG. 1, this image classification method is applied to a positioning system for wafer. The positioning method for wafer includes a terminal 110 and/or a server 120. The terminal 110 and the server 120 are connected through a network. The terminal 110 can specifically be a desktop terminal or a mobile terminal. The mobile terminal can be at least one of mobile phones, tablets, laptops, etc. It can also be a processor terminal installed on a positioning device for wafer, a processing device for wafer, etc. The server 120 can be implemented using independent servers or a server cluster composed of a plurality of servers.

Figure 2:
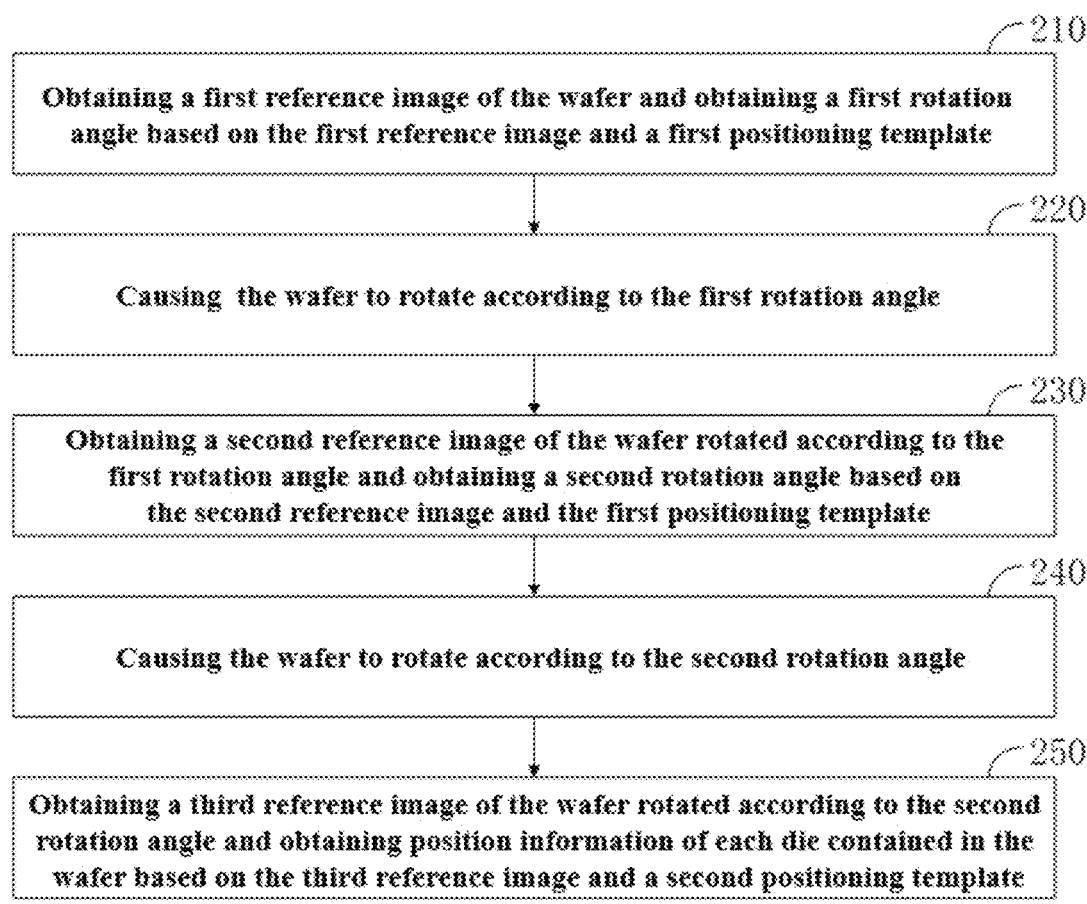
FIG. 2 shows a flowchart of the positioning method for wafer according to an embodiment of the present application.

The positioning method for wafer of the present application is applied to the terminal 110 and/or the server 120. As shown in FIG. 2, the method includes:
step 210: obtaining a first reference image of the wafer and obtaining a first rotation angle based on the first reference image and a first positioning template;
step 220: causing the wafer to rotate according to the first rotation angle;
step 230: obtaining a second reference image of the wafer rotated according to the first rotation angle and obtaining a second rotation angle based on the second reference image and the first positioning template;
step 240: causing the wafer to rotate according to the second rotation angle;
step 250: obtaining a third reference image of the wafer rotated according to the second rotation angle and obtaining position information of each die contained in the wafer based on the third reference image and a second positioning template.

The positioning method for wafer of the present application adopts two leveling steps. Even if the wafer is rotated by two angles, each die in the wafer can be matched with a reference axis, and then each die is positioned, rendering the positioning of each die in the wafer more accurate.

An important step in processing a wafer is to cut it into small rectangles based on the die. Each small rectangle can contain one die.

In the embodiment of the present application, the reference axis may be an orthogonal coordinate axis, and the reference axis may be a reference for cutting edges during subsequent wafer cutting. Cutting along the reference axis can ensure that the cutting of the wafer is carried out along grooves between adjacent dies, without cutting into an interior of the die, thereby reducing the probability of producing defective products.

In the embodiment of the present application, a purpose of rotating the wafer is to level it, and a specific meaning of leveling the wafer can refer to rendering edges of each die of the wafer to be parallel or perpendicular to the reference axis.

Figure 3:
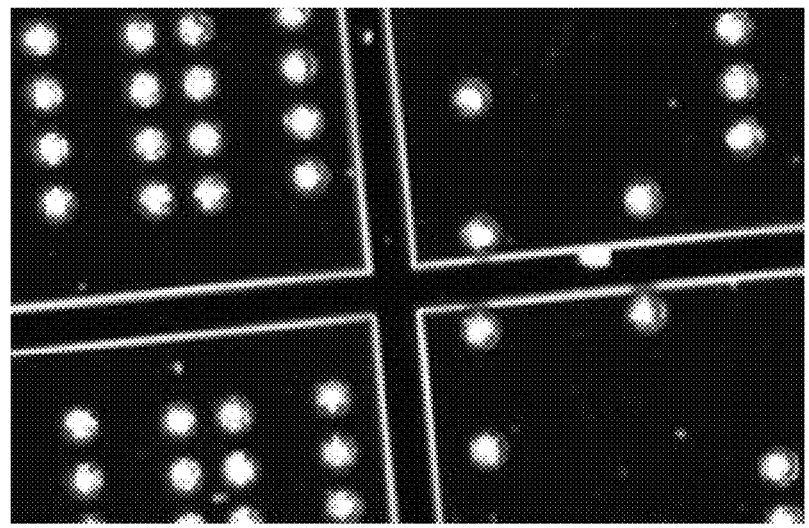
FIG. 3 shows a schematic diagram of a first positioning feature of a wafer in an embodiment of the present application.

In the embodiment of the present application, as shown in FIG. 3, a first positioning feature is a cross-shaped pattern formed by grooves between two adjacent dies in a positioning block composed of 2*2 dies. The first positioning template is a pattern that matches the first positioning feature, and the first positioning template can coincide with a reference axis.

Figure 4:
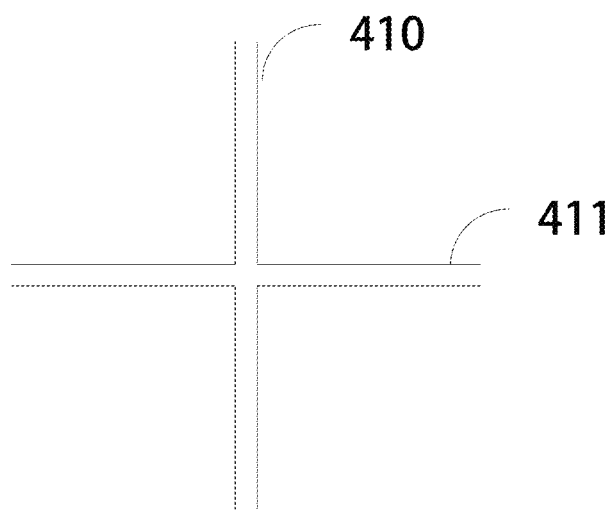
FIG. 4 shows a schematic diagram of a first positioning template according to an embodiment of the present application.

FIG. 3 shows a schematic diagram of the first positioning feature of a wafer. The wafer in FIG. 3 is not leveled, so there is a certain angle between the first positioning feature and the reference axis. FIG. 4 shows a schematic diagram of the first positioning template, the first positioning template can coincide with the reference axis. The first positioning template is a cross-shaped image, and the reference axis can be a standard orthogonal coordinate axis. The first positioning template coincides with the reference axis, which means that after moving left and right or up and down, the first positioning template can coincide with the reference axis without rotation.

The first positioning template in the embodiment of the present application can be pre-set based on a factory design and size of the wafer itself, obtained after a plurality of sampling and processing based on an actual situation of the wafer, or optimized a plurality of times based on a completed wafer positioning.

In the embodiment of the present application, step 210 includes:
obtaining a center of the wafer;
causing the wafer to move so that the center of the wafer moves to a center of a first view field;
causing the first view field to move to a plurality of random positions;
obtaining the first reference image at each random position;
obtaining one first positioning feature from each first reference image;
obtaining a first angle between each first positioning feature and the first positioning template;
obtaining an average value of all first angles as the first rotation angle.

After loading, although the center position of the wafer cannot be accurately positioned, it is generally known. In order to facilitate a subsequent positioning, the center of the wafer is usually moved to the center of the first view field.

In the embodiment of the present application, the view field refers to a view field of a camera device, the camera device is movable relative to the wafer, and therefore the view field is also movable.

In the embodiment of the present application, a size of the first view field may not be limited.

Figure 5:
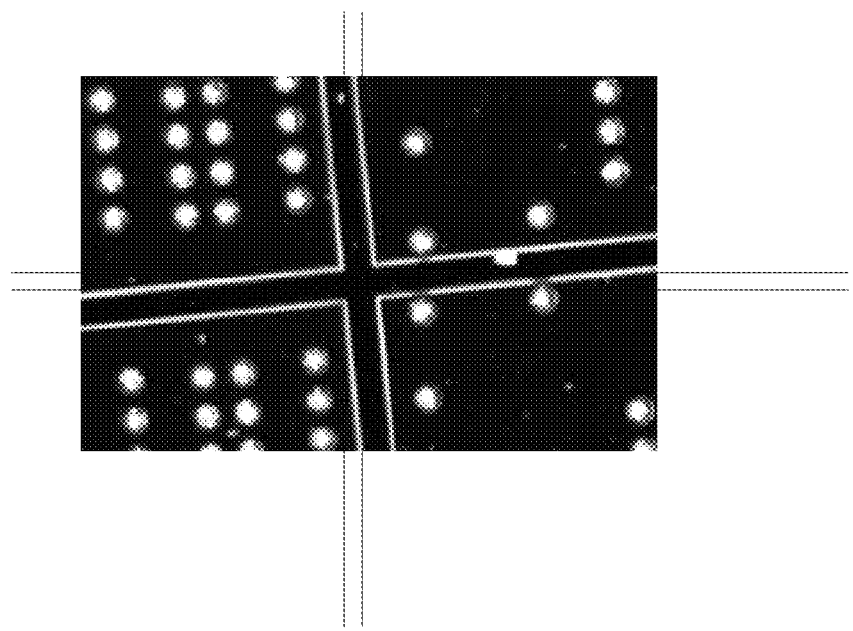
FIG. 5 shows a schematic diagram of an angle between one first positioning feature and the first positioning template in an embodiment of the present application.

In the embodiment of the present application, the first positioning feature obtained from the first reference image before leveling is usually shown in FIG. 3, and it has a certain angle with the first template, as shown in FIG. 5. An angle between the two is the first angle, and an angle after averaging a plurality of first angles is taken as the first rotation angle.

In the embodiment of the present application, before obtaining a second reference image of the wafer rotated according to the first rotation angle, the method further includes:

obtaining a height and a width of each die in the wafer;

causing a height of a second view field be greater than a half of a height of one die and less than the height of the die, causing a width of the second view field be greater than a half of a width of one die and less than the width of the die.

Limiting the height and width of the second view field is to ensure that each second reference image includes only one first positioning feature during a subsequent precise levering. In order to render the first positioning feature included in the second reference image to be clearer, the height of the second view field can be set to two-thirds or three-quarters of the height of one die. Similarly, the width of the second view field is two-thirds or three-quarters of the width of one die.

In the embodiment of the present application, in step 230, the obtaining a second reference image of the wafer rotated according to the first rotation angle and obtaining a second rotation angle based on the second reference image and the first positioning template includes:

causing the second view field to move to a plurality of sampling positions according to a first preset trajectory;

obtaining the second reference image at each sampling position;

obtaining one first positioning feature from each second reference image;

obtaining a positioning center of each first positioning feature;

fitting all positioning centers into a positioning straight line;

obtaining an angle between the positioning straight line and the first positioning template as the second rotation angle.

Figure 6:
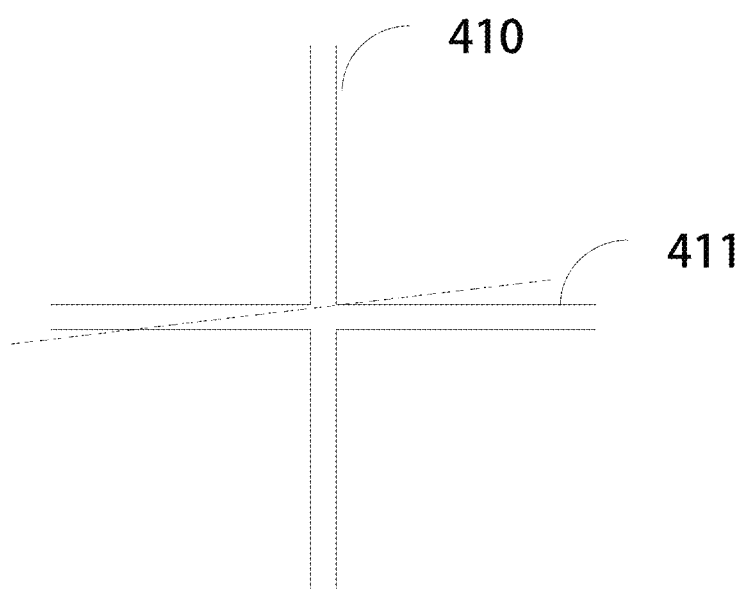
FIG. 6 shows a schematic diagram of an angle between a positioning straight line and the first positioning template in an embodiment of the present application.

The first positioning template is a cross-shaped image, and the obtaining an angle between the positioning straight line and the first positioning template refers to the angle between the positioning straight line and any straight line in the cross-shaped image of the first positioning template can be obtained. For example, in step 230, the angle between the positioning straight line and the first positioning template 411 can be obtained, or the angle between the positioning straight line and the first positioning template 412 can be obtained. The positioning straight line is shown by a dashed line in FIG. 6. The second rotation angle between the positioning straight line and the first positioning template 412 is 5 degrees, so the wafer needs to be rotated clockwise by 5 degrees. The angle between the positioning straight line and the first positioning template 411 is 85 degrees, so the wafer needs to be rotated counterclockwise by 85 degrees, or it can also be rotated clockwise by 5 degrees. The purpose of rotating the wafer is to render the positioning straight line to be parallel to any straight line in the first positioning template, or perpendicular to any straight line in the first positioning template.

Using centers of a plurality of positioning features to fit the positioning straight line and leveling the angle between the positioning straight line and the first positioning template, the positioning is more accuracy.

In the embodiment of the present application, after causing the wafer to rotate according to the second rotation angle and before obtaining a third reference image of the wafer rotated according to the second rotation angle, the method further includes:

causing the second view field to move to a plurality of calibration positions according to a second preset trajectory;

obtaining a calibration image at each calibration position;

obtaining one first positioning feature from each calibration image;

obtaining a positioning center of each first positioning feature;

fitting all positioning centers as a calibration straight line;

determining whether an angle between the calibration straight line and the first positioning template meets a preset threshold;

when the preset threshold is met, confirming that the wafer has been leveled;

when the preset threshold is not met, re-obtaining the second rotation angle.

In the embodiment of the present application, after a second leveling, it is necessary to obtain the second rotation angle again. A method for obtaining the second rotation angle again is as described above and will not be repeated here.

In the embodiment of the present application, similar to the above embodiments, since the first positioning template includes two mutually perpendicular straight lines, there may be two angles between the calibration straight line and the first positioning template, such as 5 degrees and 85 degrees, and a sum of the two angles is 90 degrees. If the angle between the calibration straight line and the first positioning template is calculated as a smaller angle, then a value meets the preset threshold value is the value that is less than or equal to the preset angle, such as less than 0.1 degrees. If the angle between the calibration straight line and the first positioning template is calculated as a larger angle, then a value meets the preset threshold value is the value that is greater than or equal to the preset angle, such as greater than 89.9 degrees.

In the embodiment of the present application, the first preset trajectory is:

starting from an initial position, moving upwards along a longitudinal axis of the reference axis with a first preset length as a step size, determining several trajectory positions, returning to the initial position, moving downwards along the longitudinal axis of the reference axis with the first preset length as the step size, and determining the several trajectory positions;

the second preset trajectory is:

starting from an initial position, moving along a horizontal axis of the reference axis to right with a second preset length as a step size, determining several trajectory positions, returning to the initial position, moving along the horizontal axis of the reference axis to left with the second preset length as the step size, and determining the several trajectory positions.

In an implementation mode of the present application, the first preset trajectory is:

starting from an initial position, moving along a horizontal axis of the reference axis to right with a first preset length as a step size, determining several trajectory positions, returning to the initial position, moving along the horizontal axis of the reference axis to left with the first preset length as the step size, and determining the several trajectory positions;

the second preset trajectory is:
starting from an initial position, moving upwards along a longitudinal axis of the reference axis with a second preset length as a step size, determining several trajectory positions, returning to the initial position, moving downwards along the longitudinal axis of the reference axis with the second preset length as the step size, and determining the several trajectory positions.

In an implementation mode of the present application, the first preset trajectory and the second preset trajectory may also be other trajectories. For example, the first preset trajectory starts from a position and only moves in one direction along one axis of the reference axis without returning to the initial position, and the second preset trajectory starts from a position and only moves in one direction along another axis of the reference axis without returning to the initial position. Or the first preset trajectory needs to return to the initial position, while the second preset trajectory does not need to return to the initial position; or the first preset trajectory does not need to return to the initial position, while the second preset trajectory needs to return to the initial position.

In the embodiment of the present application, when re-obtaining the second rotation angle, in order to avoid repetition with a previous leveling, the preset trajectory can be adjusted, such as adjusting the preset step size, adjusting the initial position, etc.

In an implementation mode of the present application, the step size of each movement may be equal or may not be equal.

In the embodiment of the present application, a second positioning feature is a specific shape on the wafer, and the second positioning template is a specific shape that matches the second positioning feature.

Usually, there are one or two dies on the wafer specifically used for positioning, the dies are called marks. Generally, marks of the wafer from the same manufacturer and same batch are the same, while marks of the wafer from different batches and manufacturers are different.

Since the marks of the wafers form different batches and manufacturers are different. Therefore, before positioning each batch of wafers, it may be necessary to set them in advance, such as performing fine segmentation, image recognition, screening, matching, etc. on panoramic images of the wafer, and selecting special patterns that are different from those of other dies in the wafer as marks. Or it can be set according to factory parameters of the wafer, for example, the mark of some wafers is set at an outermost position of the wafers, and the mark of some wafers is set at a center of the wafers.

In the embodiment of the present application, the obtaining a third reference image of the wafer rotated according to the second rotation angle and obtaining position information of each die contained in the wafer based on the third reference image and a second positioning template, includes:
causing the second view field to move to an area near the second positioning feature on the wafer;
starting from any position in the area near the second positioning feature, moving to a plurality of reference positions according to a third preset trajectory;
obtaining the third reference image at each reference position;
obtaining one second positioning feature from each third reference image;
taking a reference position of an obtained second positioning feature as a positioning position;
obtaining the position information of each die based on the positioning position, a height of each die, a width of each die, and widths of the grooves.

In the embodiment of the present application, the third preset trajectory may be a spiral path.

When the wafer leaves the factory, the height of each die, the width of each die, and widths of grooves are known. After detecting the mark, the positioning position of each die can be calculated.

In an embodiment of the present application, the width of each die is X, the height of each die is Y, and the width of the groove is M. Therefore, a coordinate system is established with a center of the mark as the origin, and a center coordinate of the die adjacent to the mark can be (X+M, 0). The coordinates of remaining dies can be calculated as above way and will not be repeated here.

The method of the embodiment of the present application, based on the characteristics of the wafer itself, the leveling has been carried out twice with high accuracy. Therefore, after leveling, the positioning of each die can also be accurately achieved, which can meet needs of the subsequent processing.

An embodiment of the present application further provide a processing method for wafer, which includes positioning a to-be-processed wafer with the positioning method for wafer and processing the to-be-processed wafer.

Figure 7:
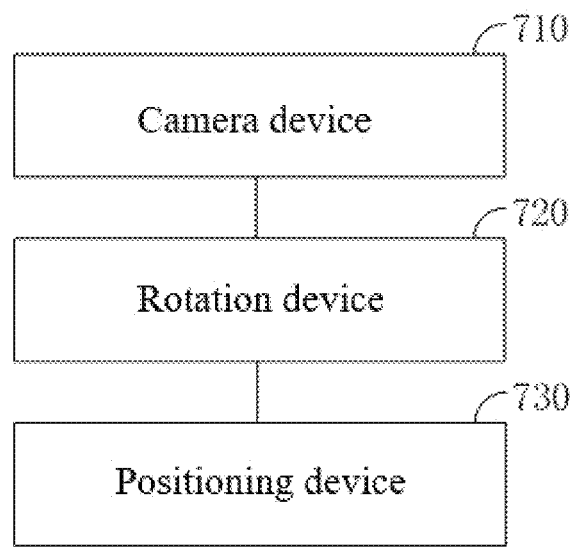
FIG. 7 shows a structural block diagram of a positioning device for wafer according to an embodiment of the present application.

An embodiment of the present application further provides a positioning device for wafer, as shown in FIG. 7, including:
a camera device 710, configured to obtain a first reference image of the wafer and obtain a first rotation angle based on the first reference image and a first positioning template;
a rotation device 720, configured to cause the wafer to rotate at the first rotation angle;
where the camera device 710 is further configured to obtain a second reference image of the wafer rotated according to the first rotation angle and obtain a second rotation angle based on the second reference image and the first positioning template;
the rotation device 720 is further configured to cause the wafer to rotate according to the second rotation angle; and
a positioning device 730, configured to obtain a third reference image of the wafer rotated according to the second rotation angle and obtain position information of each die contained in the wafer based on the third reference image and a second positioning template.

The device of the embodiment of the present application has been leveled twice according to the characteristics of the wafer itself, and the leveling accuracy is high. Therefore, after an accurate leveling, the positioning of each die can also be accurately achieved, which can meet the needs of the subsequent processing.

An embodiment of the present application further provides a computer device, including a memory, a processor, and a computer program stored on the memory and executable on the processor. When the processor executes the computer program, it implements the following steps: obtaining a first reference image of a wafer and obtaining a first rotation angle based on the first reference image and a first positioning template; causing the wafer to rotate according to the first rotation angle; obtaining a second reference image of the wafer rotated according to the first rotation angle and obtaining a second rotation angle based on the second reference image and the first positioning template; causing the wafer to rotate according to the second rotation angle; obtaining a third reference image of the wafer rotated according to the second rotation angle and obtaining position information of each die contained in the wafer based on the third reference image and a second positioning template; where the wafer includes a plurality of dies.

An embodiment of the present application further provides a computer-readable storage medium on which a computer program is stored. When the computer program is executed by a processor, it implements the follows steps: obtaining a first reference image of a wafer and obtaining a first rotation angle based on the first reference image and a first positioning template; causing the wafer to rotate according to the first rotation angle; obtaining a second reference image of the wafer rotated according to the first rotation angle and obtaining a second rotation angle based on the second reference image and the first positioning template; causing the wafer to rotate according to the second rotation angle; obtaining a third reference image of the wafer rotated according to the second rotation angle and obtaining position information of each die contained in the wafer based on the third reference image and a second positioning template, where the wafer includes a plurality of dies.

The positioning method for wafer achieves beneficial effects in solving the technical problems raised in the background technology.

FIG. 2 is a flowchart of a positioning method for wafer in an embodiment. It should be understood that although various steps in the flowchart of FIG. 2 are displayed in an order indicated by arrows, these steps are not necessarily executed in the order indicated by the arrows. Unless otherwise specified in this specification, there is no strict order limit for the execution of these steps, and they can be executed in other orders. Besides that, at least some of the steps in FIG. 2 may include a plurality of sub-steps or sub-stages, which are not necessarily completed at the same time but can be executed at different times. The execution order of these sub-steps or sub-stages is not necessarily sequential, but can be implemented by turns or alternately with at least some of other steps or sub-steps or sub-stages of other steps.

Figure 8:
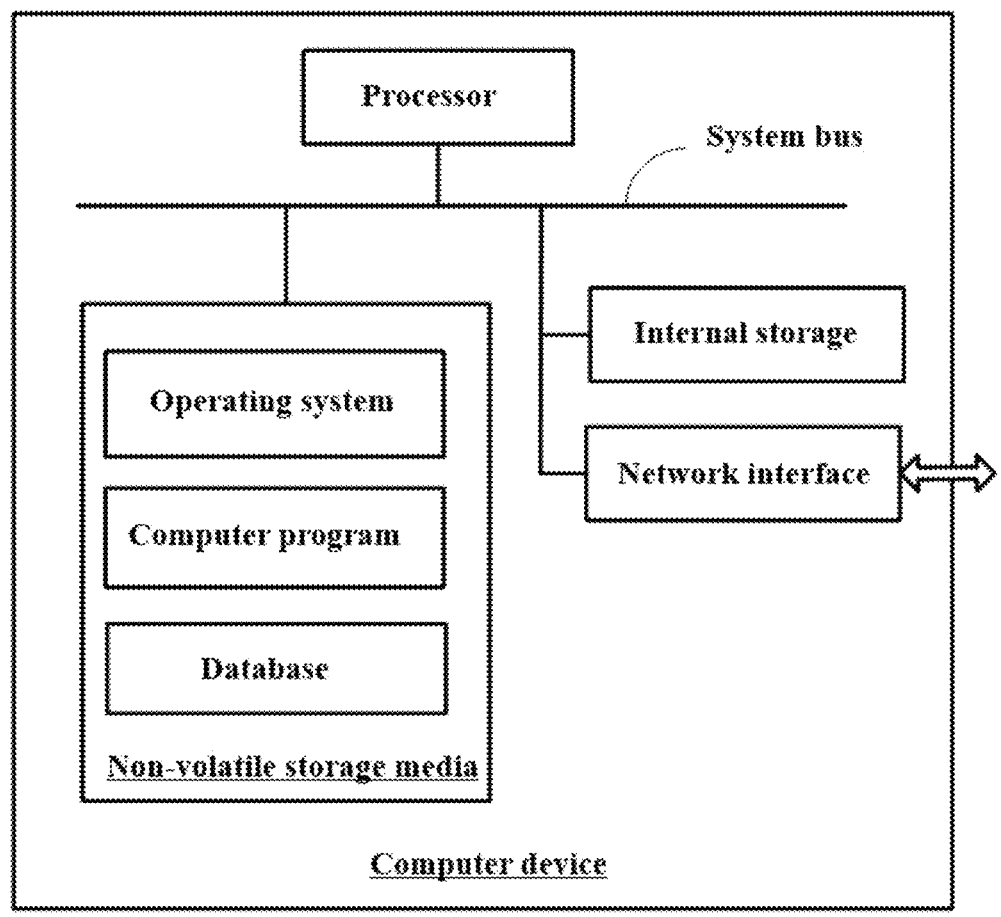
FIG. 8 shows an internal structure diagram of a computer device according to an embodiment of the present application.

FIG. 8 shows an internal structure diagram of a computer device in an embodiment. The computer device can specifically be the server 120 and the terminal 110 in FIG. 1. As shown in FIG. 8, the computer device includes a processor, a memory, a network interface, an input device, and a display screen connected through a system bus. Where, the storage includes non-volatile storage media and internal memory. The non-volatile storage medium of the computer device stores an operating system and can also store a computer program. When the computer program is executed by the processor, it can enable the processor to implement the positioning method for wafer. The internal memory can also store the computer program, which, when executed by the processor, can cause the processor to perform the positioning method for wafer. The display screen of the computer device can be a liquid crystal display screen or an electronic ink display screen. The input device of the computer device can be a touch layer covered on the display screen, buttons, trackball or touchpad provided on a shell of the computer device, or an external keyboard, touchpad or mouse.

Those skilled in the art can understand that the structure shown in FIG. 8 is only a block diagram of a part of the structure related to the present application, and does not constitute a limitation on the computer device to which the present application is applied. Specific computer device may include more or fewer components than shown in the figure, or combine certain components, or have different component arrangements.

Those skilled in the art can understand that implementing all or part of the process in the above embodiments can be accomplished by instructing relevant hardware through the computer program. The program can be stored in a non-volatile computer-readable storage medium, and when executed, it may include the process of the embodiment of the method. Where, any reference to memory, storage, database or other media used in the embodiment provided in the present application may include non-volatile and/or volatile memory. The non-volatile memory can include read-only memory (ROM), programmable ROM (PROM), electrically programmable ROM (EPROM), electrically erasable programmable ROM (EEPROM), or flash memory. Volatile memory can include random access memory (RAM) or external cache memory. As an illustration and not a limitation, RAM can be obtained in various forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), Rambus direct RAM (RDRAM), direct memory bus dynamic RAM (DRDRAM), and memory bus dynamic RAM (RDRAM).

It should be noted that in this specification, relationship terms such as "first" and "second" are only used to distinguish one entity or operation from another, and do not necessarily require or imply any actual relationship or order between these entities or operations. Besides that, terms "including", "comprising", or any other variation thereof are intended to encompass non-exclusive inclusion, such that a process, method, item, or device that includes a series of elements includes not only those elements, but also other elements not explicitly listed, or elements inherent to such process, method, item, or device. Without further limitations, the element defined by a statement "including one . . . " does not exclude an existence of other identical elements in the process, method, item, or device that includes the element.

The above description is only specific implementation modes of the present application, which enables those skilled in the art to understand or implement the present application. Various modifications to these embodiments will be apparent to those skilled in the art, and the general principles defined herein can be implemented in other embodiments without departing from the spirit or scope of the present application. Therefore, the present application will not be limited to the embodiments shown herein, but will be within a widest scope consistent with the principles and novel features applied herein.

What is claimed is:

1. A positioning method for wafer, wherein the wafer comprises a plurality of dies, and the positioning method for wafer comprises:
   obtaining a first reference image of the wafer and obtaining a first rotation angle based on the first reference image and a first positioning template;
   causing the wafer to rotate according to the first rotation angle;
   obtaining a second reference image of the wafer rotated according to the first rotation angle and obtaining a second rotation angle based on the second reference image and the first positioning template;
   causing the wafer to rotate according to the second rotation angle;

obtaining a third reference image of the wafer rotated according to the second rotation angle and obtaining position information of each die contained in the wafer based on the third reference image and a second positioning template; wherein a first positioning feature is a cross-shaped pattern formed by grooves between two adjacent dies in a positioning block composed of 2*2 dies;

the first positioning template is a pattern that matches the first positioning feature, and the first positioning template is capable of being coincided with a reference axis;

wherein a second positioning feature is a specific shape on the wafer, and the second positioning template is a specific shape that matches the second positioning feature, and the specific shape is mark in the wafer.

2. The positioning method for wafer according to claim 1, wherein the obtaining a first reference image of the wafer and obtaining a first rotation angle based on the first reference image and a first positioning template comprises:
obtaining a center of the wafer;
causing the wafer to move so that the center of the wafer moves to a center of a first view field;
causing the first view field to move to a plurality of random positions;
obtaining the first reference image at each random position;
obtaining one first positioning feature from each first reference image;
obtaining a first angle between each first positioning feature and the first positioning template;
obtaining an average value of all first angles as the first rotation angle.

3. The positioning method for wafer according to claim 2, wherein before obtaining a second reference image of the wafer rotated according to the first rotation angle, the method further comprises:
obtaining a height and a width of each die in the wafer;
causing a height of a second view field be greater than a half of a height of one die and less than the height of the die,
causing a width of the second view field be greater than a half of a width of one die and less than the width of the die.

4. The positioning method for wafer according to claim 3, wherein the obtaining a second reference image of the wafer rotated according to the first rotation angle and obtaining a second rotation angle based on the second reference image and the first positioning template comprises:
causing the second view field to move to a plurality of sampling positions according to a first preset trajectory;
obtaining the second reference image at each sampling position;
obtaining one first positioning feature from each second reference image;
obtaining a positioning center of each first positioning feature;
fitting all positioning centers into a positioning straight line;
obtaining an angle between the positioning straight line and the first positioning template as the second rotation angle.

5. The positioning method for wafer according to claim 4, wherein after causing the wafer to rotate according to the second rotation angle and before obtaining a third reference image of the wafer rotated according to the second rotation angle, the method further comprises:

causing the second view field to move to a plurality of calibration positions according to a second preset trajectory;
obtaining a calibration image at each calibration position;
obtaining one first positioning feature from each calibration image;
obtaining a positioning center of each first positioning feature;
fitting all positioning centers as a calibration straight line;
determining whether an angle between the calibration straight line and the first positioning template meets a preset threshold;
when the preset threshold is met, confirming that the wafer has been leveled;
when the preset threshold is not met, re-obtaining the second rotation angle.

6. The positioning method for wafer according to claim 5, wherein the first preset trajectory is:
starting from an initial position, moving upwards along a longitudinal axis of the reference axis with a first preset length as a step size, determining several trajectory positions, returning to the initial position, moving downwards along the longitudinal axis of the reference axis with the first preset length as the step size, and determining the several trajectory positions;
the second preset trajectory is:
starting from an initial position, moving along a horizontal axis of the reference axis to right with a second preset length as a step size, determining several trajectory positions, returning to the initial position, moving along the horizontal axis of the reference axis to left with the second preset length as the step size, and determining the several trajectory positions.

7. The positioning method for wafer according to claim 5, wherein the first preset trajectory is:
starting from an initial position, moving along a horizontal axis of the reference axis to right with a first preset length as a step size, determining several trajectory positions, returning to the initial position, moving along the horizontal axis of the reference axis to left with the first preset length as the step size, and determining the several trajectory positions;
the second preset trajectory is:
starting from an initial position, moving upwards along a longitudinal axis of the reference axis with a second preset length as a step size, determining several trajectory positions, returning to the initial position, moving downwards along the longitudinal axis of the reference axis with the second preset length as the step size, and determining the several trajectory positions.

8. The positioning method for wafer according to claim 5, wherein the obtaining a third reference image of the wafer rotated according to the second rotation angle and obtaining position information of each die contained in the wafer based on the third reference image and a second positioning template comprises:
causing the second view field to move to an area near the second positioning feature on the wafer;
starting from any position in the area near the second positioning feature, moving to a plurality of reference positions according to a third preset trajectory;
obtaining the third reference image at each reference position;
obtaining one second positioning feature from each third reference image;
taking a reference position of an obtained second positioning feature as a positioning position;

obtaining the position information of each die based on the positioning position, a height of each die, a width of each die, and widths of the grooves.

9. A processing method for wafer, comprising:

positioning a to-be-processed wafer with the method according to claim 1, and processing the to-be-processed wafer.

10. A positioning device for wafer, comprising:

a camera device, configured to obtain a first reference image of the wafer and obtain a first rotation angle based on the first reference image and a first positioning template;

a rotation device, configured to cause the wafer to rotate at the first rotation angle;

wherein the camera device is further configured to obtain a second reference image of the wafer rotated according to the first rotation angle and obtain a second rotation angle based on the second reference image and the first positioning template;

the rotation device is further configured to cause the wafer to rotate according to the second rotation angle; and a positioning device, configured to obtain a third reference image of the wafer rotated according to the second rotation angle and obtain position information of each die contained in the wafer based on the third reference image and a second positioning template.

\* \* \* \* \*